United States Patent
Wilkins

(10) Patent No.: US 10,314,249 B2
(45) Date of Patent: Jun. 11, 2019

(54) SYSTEMS AND METHODS OF INDUCING RAINFALL

(71) Applicant: The Boeing Company, Huntington Beach, CA (US)

(72) Inventor: Donald F. Wilkins, O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 469 days.

(21) Appl. No.: 14/565,528

(22) Filed: Dec. 10, 2014

(65) Prior Publication Data

US 2016/0165813 A1   Jun. 16, 2016

(51) Int. Cl.
 *A01G 15/00*   (2006.01)
 *B64D 1/18*   (2006.01)

(52) U.S. Cl.
 CPC ............. *A01G 15/00* (2013.01); *B64D 1/18* (2013.01)

(58) Field of Classification Search
 CPC .... A01G 15/00; F17C 2270/0189–2270/0192; F25J 1/0015; F25J 2270/912; B64D 1/18; B64D 1/02; B64D 1/20; Y02T 50/54; B64C 2201/125; B64C 39/02
 USPC ............... 239/2.1, 14.1, 14.2, 171; 222/136; 244/136
 See application file for complete search history.

(56) References Cited

U.S. PATENT DOCUMENTS

| | | | | |
|---|---|---|---|---|
| 1,928,963 | A * | 10/1933 | Chaffee | A01G 15/00 239/2.1 |
| 5,174,498 | A * | 12/1992 | Popovitz-Biro | A01G 15/00 239/2.1 |
| 5,584,194 | A * | 12/1996 | Gardner | C01B 23/0094 62/615 |
| 6,082,137 | A * | 7/2000 | Higginbotham | F25J 3/04193 62/646 |
| 6,257,019 | B1 * | 7/2001 | Oakey | F25J 3/04084 62/646 |
| 2004/0134997 | A1 * | 7/2004 | Khain | E01H 13/00 239/14.1 |
| 2007/0101762 | A1 * | 5/2007 | Schaub | F25J 3/0409 62/617 |
| 2009/0072078 | A1 * | 3/2009 | Choi | B64B 1/06 244/30 |
| 2009/0120129 | A1 * | 5/2009 | Howard | F25J 3/0423 62/651 |
| 2009/0320520 | A1 * | 12/2009 | Parsnick | F25J 3/04224 62/648 |

(Continued)

OTHER PUBLICATIONS

Baum, Dan; Summon the Rain; Scientific American; Jun. 2014; pp. 56-63.

(Continued)

*Primary Examiner* — Steven J Ganey
(74) *Attorney, Agent, or Firm* — Armstrong Teasdale LLP

(57) ABSTRACT

A system for use in inducing rainfall is provided. The system includes an aircraft configured to travel through an ambient environment at a first temperature, and a precipitation system coupled to the aircraft. The precipitation system is configured to form a particle from a substance in the ambient environment, and is configured to discharge the particle at a second temperature lower than the first temperature such that moisture in the air condenses on the particle.

13 Claims, 5 Drawing Sheets

(56) References Cited

U.S. PATENT DOCUMENTS

| | | | | |
|---|---|---|---|---|
| 2010/0002353 A1* | 1/2010 | Barinov | .................... | H05F 1/00 |
| | | | | 361/212 |
| 2011/0174892 A1* | 7/2011 | Fluhrer | .................. | A01G 15/00 |
| | | | | 239/2.1 |
| 2013/0206912 A1* | 8/2013 | Bright | ..................... | B64D 1/18 |
| | | | | 244/136 |

OTHER PUBLICATIONS

Meteo Systems; Traditional Cloud Seeding vs. WeatherTec (TM); available at http://sindicatum.com/meteosystems/weathertec-overview/cloud-seeding-vs-weathertec; last visited Sep. 16, 2014; 2 pp.

Rectenna; Wikipedia; available at http://en.wikipedia.org/wiki/Rectenna; last visited Sep. 16, 2014, 3 pp.

Resnick, Brian; Can California Make It Rain With Drones; National Journal; available at http://www.nationaljournal.com/energy/can-california-make-it-rain-with-drones-20141007; last visited Dec. 10, 2014; 3 pp.

Lenschow, Donald H.; How Do Water Droplets in Clouds Cohere?; Scientific American; available at http://www.scientificamerican.com/article/how-do-water-droplets-in/; last visited Sep. 16, 2014.

* cited by examiner

SYSTEMS AND METHODS OF INDUCING RAINFALL

BACKGROUND

The field of the present disclosure relates generally to weather modification and, more specifically, to systems and methods of inducing rainfall with an aerial vehicle.

Water shortages and drought have recently been increasing in frequency and duration in certain regions of the world. Drought can be caused by a variety of factors such as low precipitation, lack of moisture in air, unsuitable temperatures for facilitating condensation of moisture in the air, improper timing of water availability, or decreased access to water supplies. Regardless of the cause, drought can have severe economic and ecological consequences on affected regions. At least some known responses to drought focus primarily on short-term solutions such as temporary water conservation and increased use of groundwater. However, such temporary solutions will generally be ineffective or insufficient to counteract the effects of long-term water shortages.

At least some known efforts at counteracting the effects of water shortages and drought have focused on weather modification techniques such as cloud seeding and cloud ionization. Cloud seeding includes injecting particles of silver iodide or other suitable substances from an aircraft into the atmosphere, which enables moisture to collect on the particles, freeze, and fall to the ground in the form of water. However, cloud seeding is generally costly and its effectiveness limited by particle supply and flight time of the aircraft injecting the particles into the atmosphere. Cloud ionization includes radiofrequency antennas that emit negatively charged ions into the atmosphere. In theory, the negatively charged ions will increase the likelihood that supercooled droplets of moisture will collide with a frozen nuclei, thus becoming rain. However, the effectiveness of ground-based cloud ionization is debatable.

BRIEF DESCRIPTION

In one aspect, a system for use in inducing rainfall is provided. The system includes an aircraft configured to travel through an ambient environment at a first temperature, and a precipitation system coupled to the aircraft. The precipitation system is configured to form a particle from a substance in the ambient environment, and is configured to discharge the particle at a second temperature lower than the first temperature such that moisture in the air condenses on the particle.

In another aspect, a method of inducing rainfall is provided. The method includes launching an aircraft configured to travel in an ambient environment at a first temperature, using a precipitation system onboard the aircraft to form a particle from a substance in the ambient environment, and discharging the particle at a second temperature lower than the first temperature such that moisture in the air condenses on the particle.

DETAILED DESCRIPTION

The implementations described herein relate to systems and methods of inducing rainfall. More specifically, the systems and methods described herein facilitate inducing rainfall using substances readily available in an ambient environment. In one implementation, an aircraft includes a precipitation system having an ion generator and a refrigeration system coupled to the aircraft. The ion generator and the refrigeration system intake air as the aircraft travels through the ambient environment. The ion generator electrically charges particulate matter from the intake air such that a charged particle is formed, and the refrigeration system extracts a first substance from the intake air to form a liquid cryogen, which is then used to cool the charged particle. Using the liquid cryogen to cool the charged particle enables a temperature of the charged particle to drop below a dew point temperature of the ambient environment such that moisture condenses on the charged particle. The moisture either freezes on the charged particle and the combined particle falls to the Earth in the form of hail, or the combined particle melts as its altitude decreases and falls to the Earth in the form of rain.

Alternatively, the precipitation system includes a refrigeration system that forms a liquid particle from the liquid cryogen and discharges the liquid particle into the ambient environment at a temperature lower than the dew point temperature of the ambient environment. Moisture in the ambient environment then condenses on the liquid particle. As such, the systems and methods described herein enable rainfall to be induced for an indefinite duration as long as the aircraft is airborne. Moreover, using substances that are readily available in the ambient environment enables environmentally inert substances to be used to induce rainfall.

Figure 1:
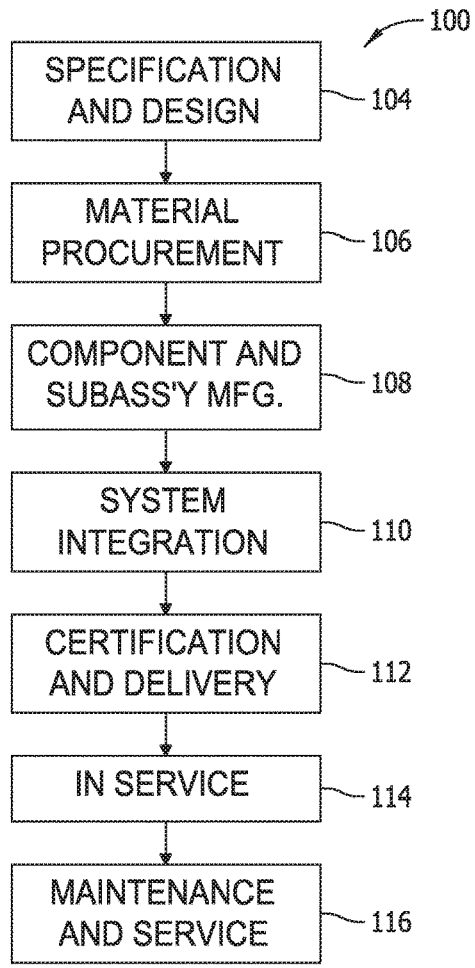
FIG. 1 is a flow diagram of an exemplary aircraft production and service method.
Figure 2:
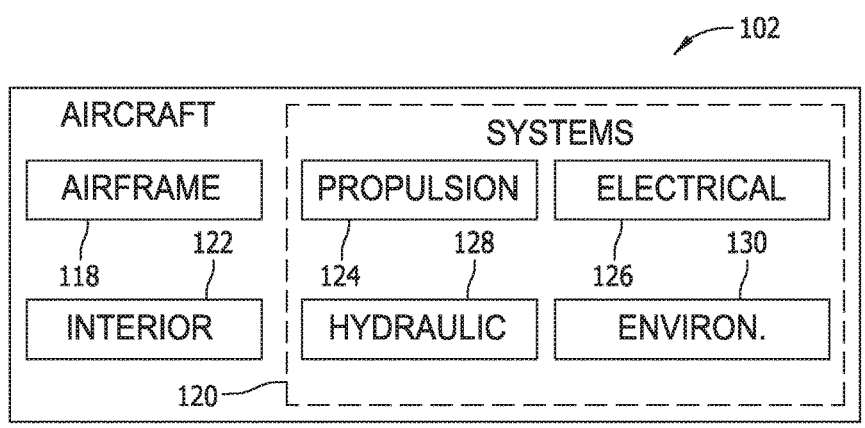
FIG. 2 is a block diagram of an exemplary aircraft.

Referring to the drawings, implementations of the disclosure may be described in the context of an aircraft manufacturing and service method 100 (shown in FIG. 1) and via an aircraft 102 (shown in FIG. 2). During pre-production, including specification and design 104 data of aircraft 102 may be used during the manufacturing process and other materials associated with the airframe may be procured 106. During production, component and subassembly manufacturing 108 and system integration 110 of aircraft 102 occurs, prior to aircraft 102 entering its certification and delivery process 112. Upon successful satisfaction and completion of airframe certification, aircraft 102 may be placed in service 114. While in service by a customer, aircraft 102 is scheduled for periodic, routine, and scheduled maintenance and service 116, including any modification, reconfiguration, and/or refurbishment, for example. In alternative implementations, manufacturing and service method 100 may be implemented via platforms other than an aircraft.

Each portion and process associated with aircraft manufacturing and/or service 100 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, aircraft 102 produced via method 100 may include an airframe 118 having a plurality of systems 120 and an interior 122. Examples of high-level systems 120 include one or more of a propulsion system 124, an electrical system 126, a hydraulic system 128, and/or an environmental system 130. Any number of other systems may be included.

Apparatus and methods embodied herein may be employed during any one or more of the stages of method 100. For example, components or subassemblies corresponding to component and subassembly production process 108 may be fabricated or manufactured in a manner similar to components or subassemblies produced while aircraft 102 is in service 114. Also, one or more apparatus implementations, method implementations, or a combination thereof may be utilized during the production stages 108 and 110, for example, by substantially expediting assembly of, and/or reducing the cost of assembly of aircraft 102. Similarly, one or more of apparatus implementations, method implementations, or a combination thereof may be utilized while aircraft 102 is being serviced or maintained, for example, during scheduled maintenance and service 116.

As used herein, the term "aircraft" may include, but is not limited to only including, airplanes, unmanned aerial vehicles (UAVs), gliders, helicopters, and/or any other object that travels through airspace. Further, in an alternative implementation, the aircraft manufacturing and service method described herein may be used in any manufacturing and/or service operation.

Figure 3:
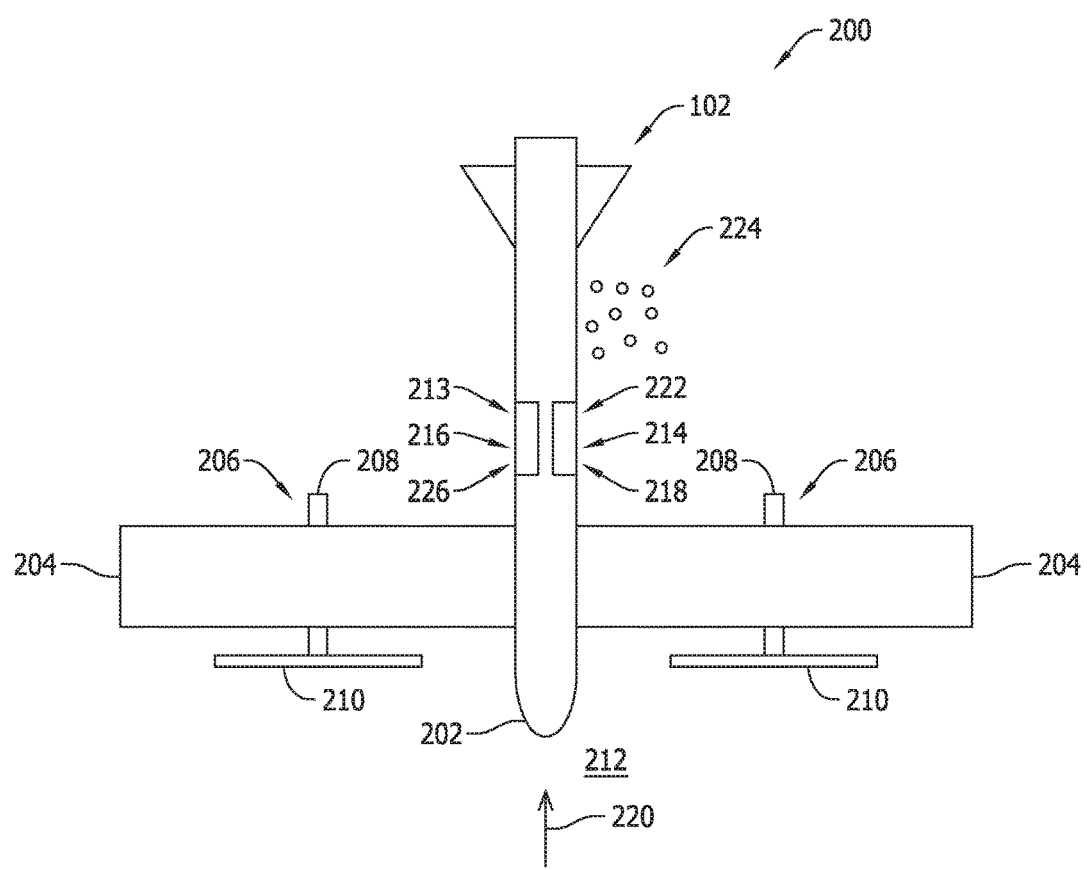
FIG. 3 is a schematic illustration of an exemplary system for use in inducing rainfall.
Figure 3A:
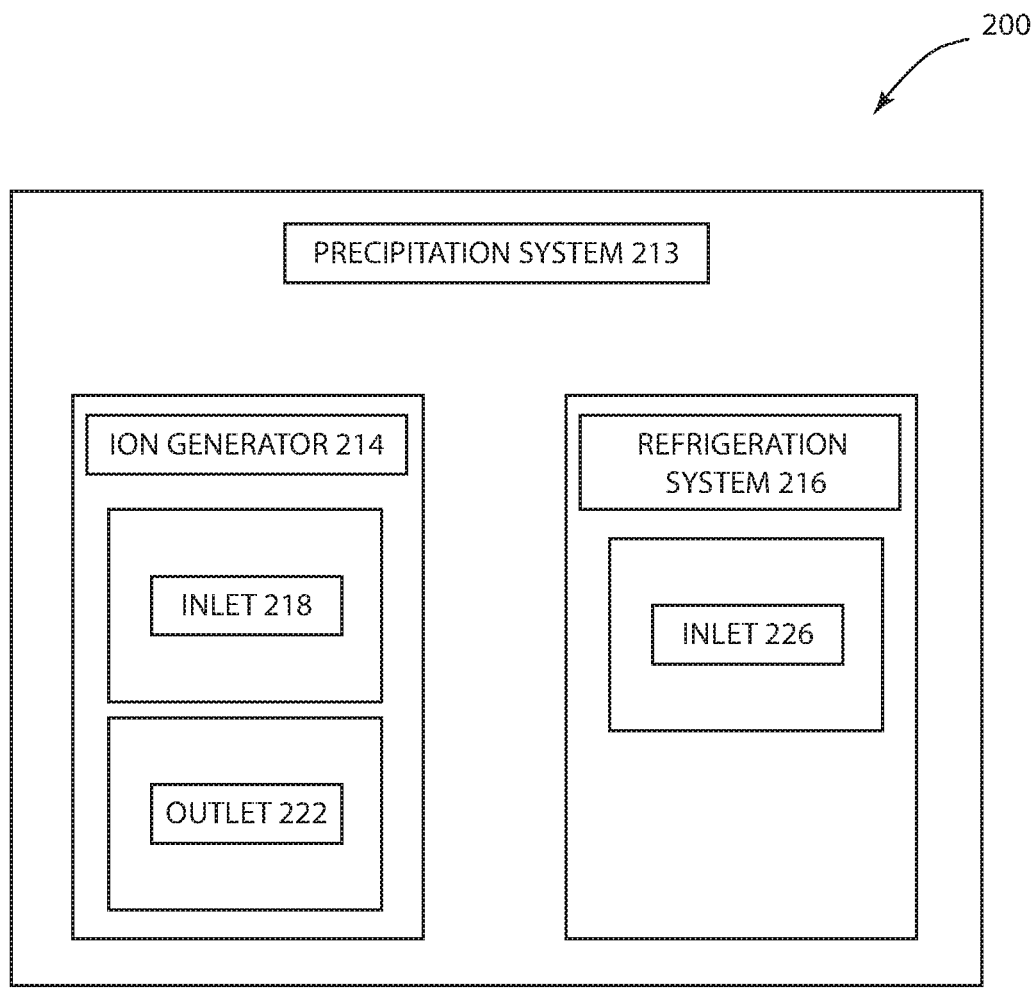
FIG. 3A is a schematic illustration of an exemplary precipitation system used with the system shown in FIG. 3.
Figure 4:
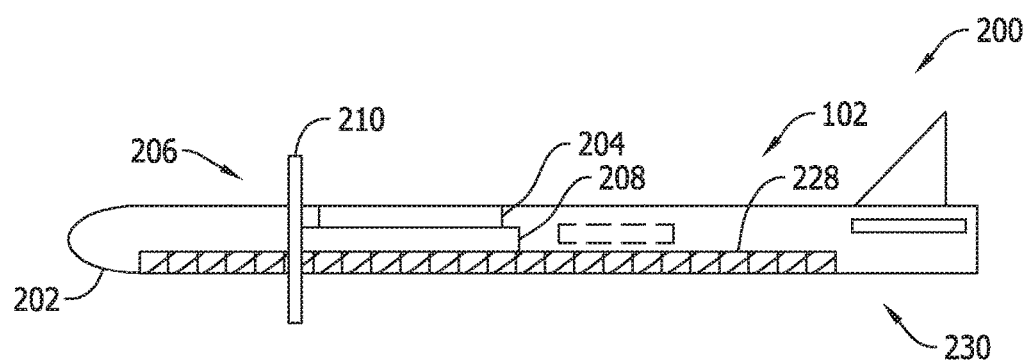
FIG. 4 is a side view schematic illustration of the system shown in FIG. 3.
Figure 5:
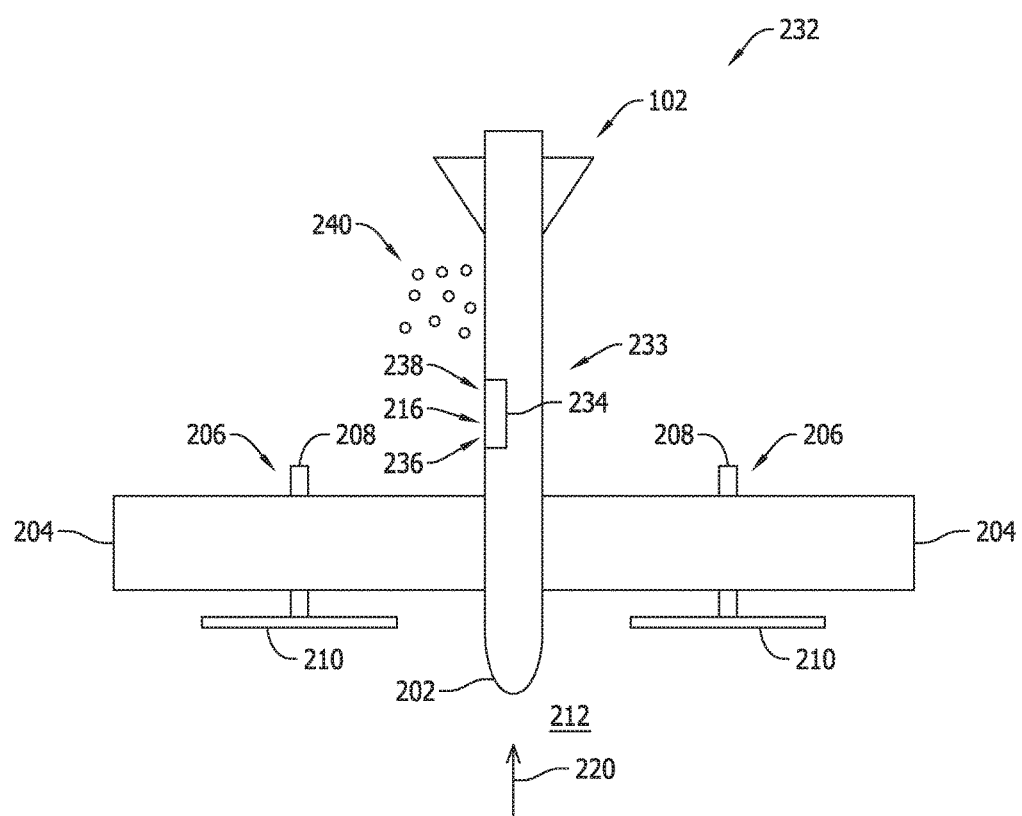
FIG. 5 is a schematic illustration of an alternative system for use in inducing rainfall.

FIG. 3 is a schematic illustration of an exemplary system 200 for use in inducing rainfall, FIG. 3A is a schematic illustration of an exemplary precipitation system 213 used with the system 200 shown in FIG. 3, and FIG. 4 is a side view schematic illustration of system 200. In the exemplary implementation, system 200 includes aircraft 102 that includes a fuselage 202, wing sections 204 coupled to fuselage 202, and an engine 206 coupled to each wing section 204. Engine 206 includes a nacelle 208 and a fan blade assembly 210. Engine 206 facilitates propelling aircraft 102 such that aircraft 102 travels through an ambient environment 212 at a first temperature. While shown as a turboprop assembly, one of ordinary skill in the art should recognize that aircraft 102 may be embodied in any aerial vehicle that enables system 200 to function as described herein, such as an aircraft having a single turboprop, one or more jet engines, and/or a rotor mast.

System 200 also includes a precipitation system 213 coupled to aircraft 102. In one implementation, precipitation system 213 includes an ion generator 214 and a refrigeration system 216 that are each coupled to aircraft 102 within fuselage 202. In some implementations, precipitation system 213 includes ion generator 214 or refrigeration system 216, but not both. In the exemplary implementation, ion generator 214 includes an inlet 218 sized to intake a first portion of a flow of air 220 from ambient environment 212, and an outlet 222 sized to discharge a plurality of charged particles 224 into ambient environment 212. More specifically, ion generator 214 includes electrodes (not shown) that electrically charge particulate matter from ambient environment 212 such that the particulate matter fuses together forming charged particles 224, which act as condensation nuclei that enable moisture in ambient environment 212 to condense thereon. In an alternative implementation, the electrodes extend from an outer surface of aircraft 102, such as from a trailing edge of wing sections 104, such that particulate matter in air 220 flowing past wing sections 104 is electrically charged.

Ion generator 214 discharges charged particles 224 into ambient environment 212 when aircraft 102 is maneuvered within a moisture-rich environment, such as when aircraft 102 is maneuvered at least one of through or into a cloud (not shown) in ambient environment 212. Charged particles 224 may have any size that enables system 200 to function as described herein. For example, in one implementation, charged particles 224 have a diameter of at least about 1 micron.

Refrigeration system 216 is coupled in communication with ion generator 214 to facilitate condensation of moisture on charged particles 224. More specifically, refrigeration system 216 cools charged particles 224 with a liquid cryogen to a second temperature lower than the first temperature either before, or as charged particles 224 are discharged into ambient environment 212. Cooling charged particles 224 to the second temperature facilitates enabling moisture to condense on charged particles 224. For example, the air in ambient environment 212 is typically saturated with an amount of water vapor, thereby defining a humidity of ambient environment 212. When the air cools, the amount of water vapor it can hold decreases. As such, when charged particles 224 are cooled to the second temperature below the dew point temperature of ambient environment 212, condensation occurs and precipitation is formed as the particle-condensate combination falls to the Earth.

Refrigeration system 216 forms the liquid cryogen from a first substance (not shown) that is readily available in ambient environment 212. In the exemplary implementation, refrigeration system 216 includes an inlet 226 sized to intake a second portion of flow of air 220 from ambient environment 212. Refrigeration system 216 extracts the first substance from air 220, condenses the first substance to form the liquid cryogen, and uses the liquid cryogen to cool charged particles 224 to the second temperature. Exemplary first substances include, but are not limited to, nitrogen and oxygen. In an alternative implementation, particles 224 are cooled using aspects of a propulsion system onboard aircraft 102, such as a chiller system of a liquid-hydrogen propulsion system.

Referring to FIG. 4, system 200 includes a rectenna array 228 coupled to aircraft 102. Rectenna array 228 is positioned on an underside portion 230 of aircraft 102, such as on fuselage 202, such that rectenna array 228 is positioned to receive microwave beams from a microwave energy source (not shown) located remotely from aircraft 102. Rectenna array 228 converts energy from the microwave beams to direct-current energy, and distributes the direct-current energy to power electrical systems 126 of aircraft 102. For example, electrical systems 126 include, but are not limited to engines 206, ion generator 214, and refrigeration system 216. As such, rectenna array 228 enables aircraft 102 to stay in flight and facilitate inducing rainfall for an indefinite duration. In an alternative implementation, system 200 may be powered by more conventional fuel sources, such as fossil fuels and solar energy, or may be powered by a liquid-hydrogen propulsion system.

FIG. 5 is a schematic illustration of an alternative system 232 for use in inducing rainfall. In the exemplary implementation, system 232 includes aircraft 102 that travels through ambient environment 212 at the first temperature, and precipitation system 233 coupled to aircraft 102. In one implementation, precipitation system 233 includes refrigeration system 216 embodied as a liquid cryogen generator 234 coupled to aircraft 102 within fuselage 202. Liquid cryogen generator 234 includes an inlet 236 sized to intake a portion of air 220 from ambient environment 212, and an outlet 238 sized to discharge a plurality of liquid particles 240 into ambient environment 212. Liquid particles 240 are formed from the liquid cryogen, and are discharged into ambient environment 212 when aircraft 102 is maneuvered within a moisture-rich environment, such as when aircraft 102 is maneuvered at least one of through or into a cloud (not shown) in ambient environment 212. In an alternative implementation, particles 240 are formed from liquid hydrogen onboard aircraft 102, such as from a liquid-hydrogen propulsion system used to propel aircraft 102.

More specifically, liquid cryogen generator 234 intakes air 220 as aircraft 102 travels through ambient environment 212, extracts the first substance from air 220, condenses the first substance to form the liquid cryogen, and discharges liquid particles 240 into ambient environment 212 formed from the liquid cryogen. Liquid particles 240 are discharged at a third temperature lower than the first temperature such that moisture in air 220 condenses on liquid particles 240. The third temperature is the same, greater than, or less than the second temperature. As such, when liquid particles 240 are cooled to the third temperature below the dew point temperature of ambient environment 212, condensation occurs and precipitation is formed as the particle-condensate combination falls to the Earth. In one implementation, liquid cryogen generator 234 extracts nitrogen from air 220 and discharges liquid particles 240 formed from liquid nitrogen into ambient environment 212.

A method of inducing rainfall is also described herein. The method includes launching aircraft 102 that travels in ambient environment 212 at the first temperature, using a precipitation system 213 or 233 to form a particle from a substance in ambient environment 212, and discharging the particle at the second or third temperature lower than the first temperature such that moisture in the air condenses on the particle. The method further includes maneuvering aircraft 102 at least one of through or into a cloud in the ambient environment as the particle is discharged from aircraft 102. As such, moisture in the cloud is more likely to condense on the particle and form precipitation.

In some implementations, using the precipitation system includes electrically charging particulate matter in the ambient environment such that the particulate matter fuses together to form the particle. Moreover, the method includes cooling the particle such that the particle is discharged at the second temperature lower than the first temperature. Cooling the particle includes intaking air as aircraft 102 travels through ambient environment 212, extracting the first substance from the air, condensing the first substance to form the liquid cryogen, and using the liquid cryogen to cool the particle. Cooling the particle further includes extracting nitrogen from the air, condensing the first substance to form liquid nitrogen, and using the liquid nitrogen to cool the particle.

Moreover, in one implementation, using the precipitation system includes intaking air as aircraft 102 travels through ambient environment 212, extracting the first substance from the air, condensing the first substance to form the liquid cryogen, and forming the particle from the liquid cryogen. Using the precipitation system further includes extracting nitrogen from the air, condensing the first substance to form liquid nitrogen, and forming the particle from the liquid nitrogen.

The systems and methods described herein facilitate inducing rainfall in an effective and environmentally safe manner. More specifically, the systems described herein induce rainfall by seeding clouds with environmentally inert substances extracted from the ambient environment. In one implementation, rain-inducing particles are discharged from an unmanned aerial vehicle. Using the unmanned aerial vehicle to distribute the particles facilitates increasing the duration that the system can be used to seed clouds without having to account for rest intervals for a pilot, for example. Unmanned aerial vehicles are also generally able to reach high altitudes such that high-altitude clouds can be induced to form precipitation using the systems described herein. Moreover, in coastal regions located adjacent to a body of water, the aerial vehicle can be maneuvered while seeding such that clouds positioned over the body of water are induced to flow towards land.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for use in inducing rainfall, said system comprising:
    an aircraft configured to travel through an ambient environment at a first temperature; and
    a precipitation system coupled to said aircraft, wherein said precipitation system is configured to:
        intake air from the ambient environment;
        form a particle from particulate matter in the intake air, wherein said precipitation system comprises a refrigeration system coupled to said aircraft, wherein said refrigeration system is configured to extract nitrogen from the intake air such that liquid nitrogen is formed to cool the particle; and
        discharge the particle at a second temperature lower than the first temperature such that moisture in the ambient environment condenses on the particle.

2. The system in accordance with claim 1, wherein said precipitation system comprises:
    an ion generator coupled to said aircraft, wherein said ion generator is configured to electrically charge the particulate matter in the intake air such that the particulate matter fuses together forming the particle, wherein said refrigeration system is configured to cool the particle to the second temperature lower than the first temperature such that moisture in the ambient environment condenses on the particle.

3. The system in accordance with claim 2, wherein said ion generator is configured to intake air as said aircraft travels through the ambient environment, electrically charge the particulate matter in the air such that the particle is formed, and discharge the particle towards the ambient environment.

4. The system in accordance with claim 2, wherein said ion generator is configured to discharge the particle into the ambient environment when said aircraft is maneuvered at least one of through or into a cloud in the ambient environment.

5. The system in accordance with claim 2, wherein said ion generator is configured to electrically charge the particulate matter such that the particle having a size of at least about 1 micron is formed.

6. The system in accordance with claim 1, wherein said aircraft comprises an unmanned aerial vehicle.

7. The system in accordance with claim 1 further comprising a rectenna array coupled to said aircraft, wherein said rectenna array is configured to receive microwave beams and convert the microwave beams to direct-current energy.

8. The system in accordance with claim 7, wherein said rectenna array is configured to distribute the direct-current energy to power electrical systems of said aircraft.

9. A method of inducing rainfall, said method comprising:

launching an aircraft configured to travel in an ambient environment at a first temperature;

intaking air from the ambient environment;

using a precipitation system, comprising a refrigeration system, onboard the aircraft to form a particle from particulate matter in the intake air;

extracting nitrogen from the air;

condensing the nitrogen to form liquid nitrogen;

using the liquid nitrogen to cool the particle; and discharging the particle at a second temperature lower than the first temperature such that moisture in the ambient environment condenses on the particle.

10. The method in accordance with claim 9 further comprising maneuvering the aircraft at least one of through or into a cloud in the ambient environment as the particle is discharged from the aircraft.

11. The method in accordance with claim 9, wherein using a precipitation system comprises electrically charging particulate matter in the ambient environment such that the particulate matter fuses together to form the particle.

12. The method in accordance with claim 11 further comprising cooling the particle such that the particle is discharged at the second temperature lower than the first temperature.

13. A system for use in inducing rainfall, said system comprising:

an aircraft configured to travel through an ambient environment at a first temperature; and a precipitation system, comprising a refrigeration system, coupled to said aircraft, wherein said refrigeration system is configured to:

intake air from the ambient environment;

extract nitrogen from the air;

condense the nitrogen to form a liquid cryogen; and discharge a cooled liquid particle formed from the liquid cryogen into the ambient environment at a second temperature lower than the first temperature such that moisture in the ambient environment condenses on the liquid particle.

* * * * *